United States Patent [19]

Parker

[11] 4,447,585

[45] May 8, 1984

[54] POLYMER BOUND ARYL SUBSTITUTED CROWN ETHERS

[75] Inventor: Dane K. Parker, Massillon, Ohio

[73] Assignee: The Goodyear Tire & Rubber Company, Akron, Ohio

[21] Appl. No.: 544,340

[22] Filed: Oct. 24, 1983

Related U.S. Application Data

[62] Division of Ser. No. 354,563, Mar. 4, 1982.

[51] Int. Cl.$^3$ .............................................. G08F 8/00
[52] U.S. Cl. ............................ 525/359.2; 525/333.4; 525/385
[58] Field of Search ................... 525/332.4, 359.2, 385

[56] References Cited

U.S. PATENT DOCUMENTS 4,043,979  8/1977  Cram ................................... 525/385
4,256,859  3/1981  Woo .................................... 525/385

FOREIGN PATENT DOCUMENTS 56-47405  4/1981  Japan .

*Primary Examiner*—J. Schofer
*Assistant Examiner*—Bernard Lipman
*Attorney, Agent, or Firm*—D. O. Nickey

[57] ABSTRACT

There is disclosed a new polymer bound catalyst, a means for the production of a polymer bound aryl substituted crown ether and use of such polymer bound aryl substituted crown ethers as catalysts.

2 Claims, No Drawings

POLYMER BOUND ARYL SUBSTITUTED CROWN ETHERS

This is a division, of application Ser. No. 354,563 filed Mar. 4, 1982.

TECHNICAL FIELD

This invention relates to a method for the production of polymer bound aryl substituted crown ethers, their use as catalysts and the catalysts themselves. More specifically, this invention relates to insoluble bound catalysts useful in phase transfer oxidations, nucleophilic displacements, reductions, carbene generation, condensations, alkylations and elimination reactions.

PRIOR ART

Triphase catalysis is a unique form of heterogeneous catalysis in which the catalyst in each of a pair of reactants are located in separate phases. A discussion of triphase catalysis systems, their preparation and mechanisms can be found in Regen, S. L.; *Angewandte Chemie*, Int. Ed. Vol. 18, No. 6, (1979) pages 421-492, said publication is herein incorporated by reference. More specifically, a discussion dealing with insolubilized crown ethers can be found on page 424 of the above cited reference.

Regen in the above-referenced article describes insoluble crown ethers that are attached to a polymeric support via a nitrogen or oxygen linkage. For a dicussion of attaching the crown ether via the amine linkage, see M. Cinquini et al, *J. Chem. Soc. Chem. Commun.* (1979) 394. For a discussion of attaching a crown ether via an oxygen linkage, see M. Tomoi et al, *Tetrahedron Lett.* 1978, 3031 and G. Dotsevi et al, *J. Am. Chem. Soc.* 98, 3038 (1976).

Previous to the process of the present invention, the only means for attaching a crown ether to a polymer backbone via a carbon linkage was by polymerization of vinyl benzo-substituted crown ethers. See S. Kopolow et al, *Macromolecules*, 6, 133 (1973).

The inventor of the present invention had conceived of and reduced to practice the process of this application prior to the filing of Japanese patent application Ser. No. 125026 (Sept. 28, 1979) laid open Apr. 3, 1981 by Mitsubishi Chem. Ind. K.K. for fixing crown ether(s) to chloromethylbridged polystyrene by reacting in the presence of aluminum chloride or zinc chloride. See Derwent Publications Central Patent Index 44816 D/25 * J5 6047-405.

The present invention is limited to triphase catalysts wherein the catalytic resin is either macroreticular or microreticular polystyrene resin modified so as to contain aryl substituted crown ethers.

A review of functionalization of crosslinked polystyrene resins by chemical modification can be found in *Chemistry and Properties of Crosslinked Polymers*, Academic Press, Inc. Santokh S. Labana, Editor (1977), pages 59 et seq., said publication is herein incorporated by reference.

Other references that will aid in understanding the present invention are: *Catalysts in Micellar and Macromolecular Systems* (1975) by J. H. and E. J. Fondler, See Chap. 11, Sec. 3, p 389, "Interaction and Catalysis in Macrocyclic Polyethers and Related Systems;" *Phase Transfer Catalysis Principles and Techniques* (1978) C. M. Starkes to C. Liotta, Chap. 3, sec. III, "Macrocyclic Ethers as Phase Transfer Catalysts", pg. 77; *Phase Transfer Catalysis in Organic Synthesis* (1977), W. Weber and G. Gobel, Chap. 1, Sec. 9, "Uncharged Catalysts: The Crown Ethers", p 9.

DISCLOSURE OF THE INVENTION

There is disclosed a composition of matter defined by the following structural formula (I):

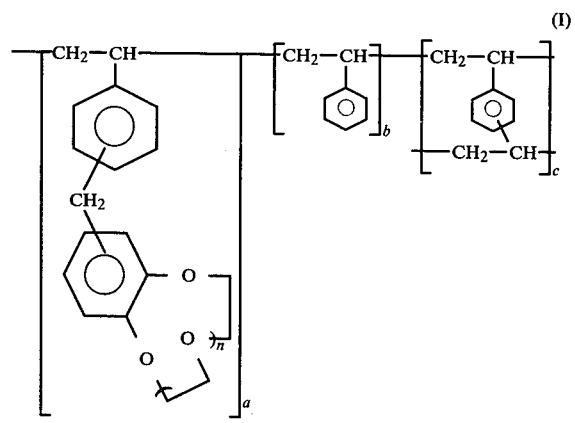

wherein n is 3 or 4 and the ratio of a to b to c may vary from 1:98:1 to 50:49:1 to 1:49:50.

Also disclosed is a process to prepare a composition of the structural formula (I) above, wherein n is 3 or 4 and the ratio of a to b to c may vary from 1:98:1 to 50:49:1 to 1:49:50, which comprises the following steps in an anhydrous environment of: (1) dissolving a compound of structural formula (II)

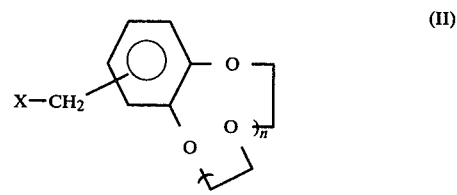

wherein n is 3 or 4 and X is a chlorine, bromine or iodine radical; in an inert solvent selected from the group consisting of $CHCl_3$, $CH_2Cl_2$, $CCl_4$, 1,2-dichloroethane, tetrachloroethane, $CS_2$, nitrobenzene, alkanes of 5 to 15 carbon atoms, benzene, and alkylasted benzenes; (2) adding this solution to a crosslinked polystyrene resin wherein said resin has at least one percent crosslinking and a particle size of no more than 20 mesh; (3) removing the inert solvent under reduced pressure; (4) adding thereto a catalyst selected from the group consisting of aluminum chloride, zinc chloride, boron trifluoride, stannic chloride and titanium tetrachloride, wherein the catalyst is dispersed in a reaction solvent selected from the group consisting of 1,2-dichloroethane, nitrobenzene and methylene chloride or the catalyst is added to the polystyrene resin which is dispersed within reaction solvent; (5) heating the reaction mixture to 50°-120° C. for 2 to 72 hours; and (6) isolating the resulting polymer bound aryl substituted crown ether.

Further, there is disclosed a process for preparing a polymer bound catalyst described in formula (I) above, which comprises the following steps in an anhydrous environment of: (1) dissolving a compound of structural formula (III):

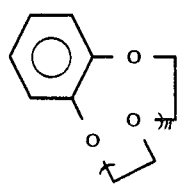

(III)

wherein n is 3 or 4; in an inert solvent selected from the group consisting of CHCl$_3$, CH$_2$Cl$_2$, CCl$_4$, 1,2-dichloroethane, tetrachloroethane, CS$_2$, nitrobenzene, alkanes of 5 to 15 carbon atoms, benzene and alkylated benzene; (2) adding this solution to a crosslinked halomethylated polystyrene resin wherein said resin has at least one percent crosslinking and a particle size of no more than 20 mesh defined by the structural formula (IV):

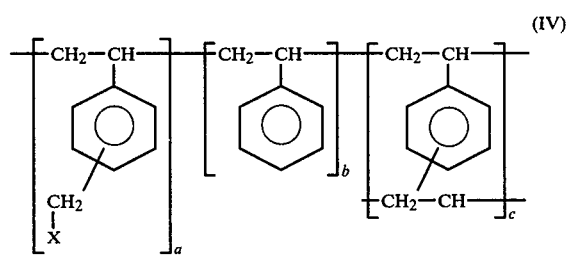

(IV)

wherein the ratio of a to b to c may vary from 1:98:1 to 50:49:1 to 1:49:50, and wherein X is selected from the group consisting of chlorine, bromine, or iodine radicals; (3) removing the inert solvent under reduced pressure; (4) adding thereto a catalyst selected from the group consisting of aluminum chloride, zinc chloride, boron trifluoride, stannic chloride and titanium tetrachloride, wherein the catalyst is dispersed in a reaction solvent selected from the group consisting of 1,2-dichloroethane, nitrobenzene, methylene chloride or the catalyst is added to the polystyrene resin which is dispersed within said reaction solvent; (5) heating the reaction mixture to 50°–120° C. for 2 to 72 hours; and (6) isolating the resulting polymer bound aryl substituted crown ether.

The process of the present invention is also concerned with the use of polymer bound aryl substituted crown ethers as a catalyst in phase transfer oxidation reactions, nucleophilic displacements, reductions, carbene generation, condensations, alkylations and elimination reactions.

The triphase or polymer bound catalyst of this invention may be easily prepared from polystyrene resins. The polystyrene resins may or may not be modified to contain reactive halogen functionalities which are then reacted with an aryl substituted crown ether that may or may not contain a reactive halo-methylated substituent. It being understood that only one reactant (the polystyrene resin or the crown ether) has a halomethyl substituent.

Representative of the aryl substituted crown ethers that can be used in the process of this invention are crown ethers defined by the structural formulae:

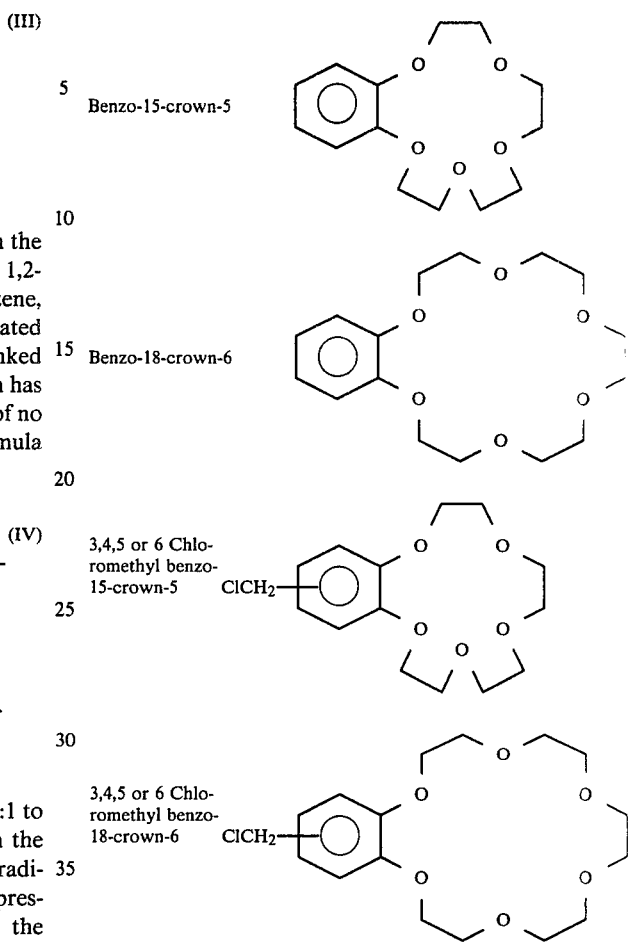

Representative of the polystyrene resins that can be used in the process of the present invention are commercially available polystyrene resins which have at least one percent crosslinking and a particle size of no more than 20 mesh. An example of a commercially available resin that is a one percent crosslinked chloromethylated polystyrene resin is Bio-beads TM S-X1 by Bio-Rad Labs, and a resin known as XE-305 which is a 4 percent crosslinked macroreticular polystyrene resin which is available from the Rohm & Haas Company. Polystyrene or halo-methylated polystyrene resins may also be prepared by conventionally known polymerization techniques. A typical procedure used to prepare a crosslinked chloromethylated polystyrene resin is given in the following recipe:

A one liter three-neck flask equipped with a nitrogen inlet, thermometer, condenser, and mechanical stirrer is charged with 400 ml of distilled water, 115 ml of toluene and 6.0 grams of cellulose (i.e. Hercules 7M grade). The mixture is stirred vigorously at room temperature and purged with nitrogen. After five minutes of stirring, 66.7 ml of styrene, 9.4 ml of vinylbenzyl chloride, 59.8 ml of 55 percent divinylbenzene and 1.1 grams of azo-bis-isobutyronitrile (AIBN) are charged to the flask and vigorously mixed. The stirring speed was adjusted to approximately 1600–1700 rpm and the mixture heated under nitrogen to 80°–85° C. for 2 to 3 hours. The polymerized beads were then filtered and washed extensively with toluene followed by acetone. This resin can then be reacted with the aryl substituted crown ether to form a compound of the present invention.

A procedure to prepare the crosslinked polystyrene without the chloromethyl functionality is similar to the preparation described above except that the vinylbenzylchloride would be omitted therefrom. This resin would then be reacted with the halomethylated aryl substituted crown ether to produce the catalyst of the present invention.

EXPERIMENTAL

The following example is intended to be illustrative and not limiting of the present invention.

EXPERIMENT 1

Attachment of Chloromethylated Benzo-15-crown-5 to Polystyrene Resin

In a 250 ml reaction flask was placed 20 grams of polystyrene resin known as XE-305 (a commercially available resin marketed by Rohm & Haas) and added thereto was 20 ml of chloroform having dissolved therein 2.0 grams of chloromethylated benzo-15 crown-5. The resin was allowed to swell and then the chloroform was removed under reduced pressure at 50° C. Then 60 ml of 1.8 molar AlCl$_3$/nitrobenzene solution was added. At this point the reaction mixture turns dark black to purple in color. The initial exotherm of the reaction went to 110° C. and then the reaction mixture was held at 35° to 40° C. for approximately 18 hours. The warm mixture was then poured into excess methanol, washed with a hot methanol/hydrochloric acid solution, water, methanol and then continuously extracted with acetone for a period of 24 hours. The polymer bound aryl substituted crown ether was isolated yielding 20.73 grams of material with approximately 0.0026 moles of attached crown ether for a yield of approximately 41 percent based on crown ether charged. An I.R. analysis of the final product indicated the presence of absorption bands at approximately 1100 cm$^{-1}$ which are peculiar to aryl substituted crown ethers and absent in unmodified polystyrene.

Uses of Compounds Of The Present Invention

The polymer bound aryl substituted crown ethers of the present invention can be used as catalysts in numerous types of reactions. Specifically, the polymer bound aryl substituted crown ethers of this invention can be used as catalysts in phase transfer oxidations, nucleophilic displacements, reductions, carbene generation, condensations, alkylations and elimination reactions.

For a discussion of reactions in which similar polymer bound crown ethers are useful, see Regen, S. L., *Angewandte Chemie*, reference supra, and *Phase Transfer Catalysis in Organic Synthesis*, 1977, by Weber and Gokel, Chapter 1, Section 9, "Unchanged Catalysts: The Crown Ethers," p 9.

Although aluminum trichloride dissolved in nitrobenzene was used as the catalyst in Example 1, other Friedel-Crafts catalysts may be used in either attaching a halomethylated crown ether to polystyrene or attaching a crown ether to a chloromethylated polystyrene resin. For a more detailed description of suitable catalysts and solvent systems, see *Friedel-Crafts and Related Reactions* by G. Olah (1963), Vol. I, Chap IV, "Catalysts and Solvents."

Industrial Applicability

This invention provides a new polymer bound catalyst, a means for the production of the polymer bound aryl substituted crown ether and describes the use of such polymer bound aryl substituted crown ethers as catalysts. Specifically, the compounds of this invention are catalysts which are recyclable and are thus ecologically and economically sound. Further, it is known that monomeric crown ethers have detrimental biological effects and through this invention such crown ethers can be chemically attached to an insoluble material which significantly decreases their biological hazard.

While certain representative embodiments and details have been shown for the purpose of illustrating the invention it will be apparent to those skilled in this art that various changes and modifications may be made therein without departing from the scope of the invention.

I claim:

1. A process to prepare a composition of of matter of the structural formula (I):

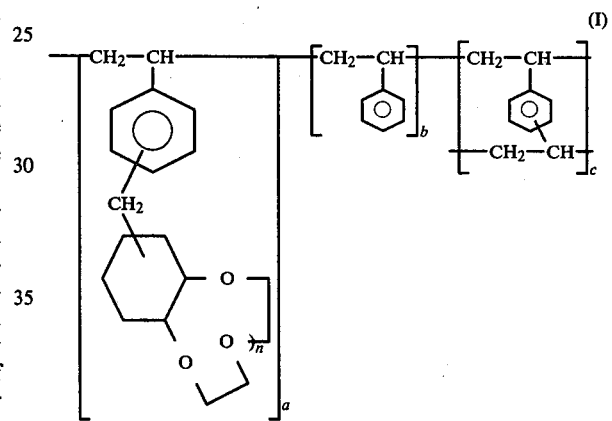

wherein n is 3 or 4 and the ratio of a to b to c may vary from 1:98:1 to 50:49:1 to 1:49:50, which comprises the following steps in an anhydrous environment of: (1) dissolving a compound of sturctural formula (II)

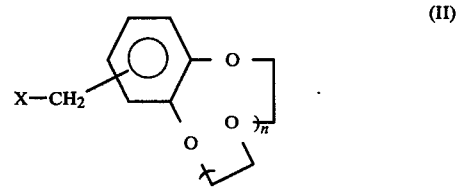

wherein n is 3 or 4 and X is a chlorine, bromine or iodine radical; in an inert solvent selected from the group consisting of CHCl$_3$, CH$_2$Cl$_2$, CCl$_4$, 1,2-dichloroethane, tetrachloroethane, CS$_2$, nitrobenzene, alkanes of 5 to 15 carbon atoms, benzene, and alkylated benzenes; (2) adding this solution to a crosslinked polystyrene resin wherein said resin has at least one percent crosslinking and a particle size of no more than 20 mesh; (3) removing the inert solvent under reduced pressure; (4) adding thereto a catalyst selected from the group consisting of aluminum chloride, zinc chloride, boron trifluoride, stannic chloride and titanium tetrachloride, wherein the catalyst is dispersed in a reaction solvent selected from the group consisting of 1,2-dichloroethane, nitrobenzene, methylene chloride or the catalyst is added to the polystyrene resin which is dispersed within a said reaction solvent; (5) heating the reaction mixture to 50°–120° C. for 2 to 72 hours; and (6) isolating the resulting polymer bound aryl substituted crown ether.

2. A process for preparing a composition of matter of the structural formula (I):

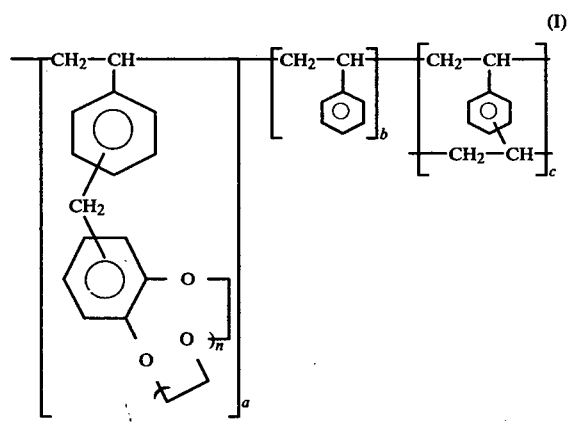

which comprises the following steps in an anhydrous environment of: (1) dissolving a compound of structural formula (III):

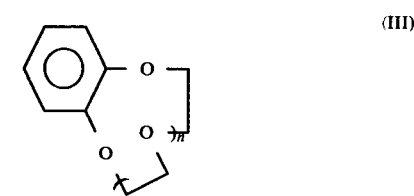

wherein n is 3 or 4 in an inert solvent selected from the group consisting of $CHCl_3$, $CH_2Cl_2$, $CCl_4$, 1,2-dichloroethane, tetrachloroethane, $CS_2$, nitrobenzene, alkanes of 5 to 15 carbon atoms, benzene and alkylated benzene; (2) adding this solution to a crosslinked halomethylated polystyrene resin wherein said resin has at least one percent crosslinking and a particle size of no more than 20 mesh defined by the structural formula (IV):

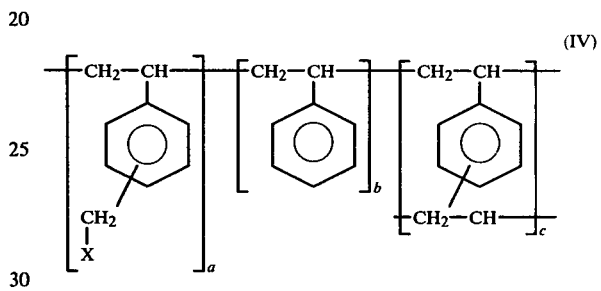

wherein the ratio of a to b to c may vary from 1:98:1 to 50:49:1 to 1:49:50, and wherein X is selected from the group consisting of chlorine, bromine, or iodine radicals; (3) removing the inert solvent under reduced pressure; (4) adding thereto a catalyst selected from the group consisting of aluminum chloride, zinc chloride, boron trifluoride, stannic chloride and titanium tetrachloride, wherein the catalyst is dispersed in a reaction solvent selected from the group consisting of 1,2-dichloroethane, nitrobenzene and methylene chloride or the catalyst is added to the polystyrene resin which is dispersed within said reaction solvent; (5) heating the reaction mixture to 50°–120° C. for 2 to 72 hours; and (6) isolating the resulting polymer bound aryl substituted crown ether.

* * * * *